(12) United States Patent
Benz et al.

(10) Patent No.: US 6,259,515 B1
(45) Date of Patent: Jul. 10, 2001

(54) EVALUATION CONCEPT FOR DISTANCE MEASURING PROCESSES

(75) Inventors: Jurgen Benz, Besigheim; Werner Philipps, Ludwigsburg; Anton Grabmaier, Bietigheim-Bissingen, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/245,514

(22) Filed: Feb. 5, 1999

(30) Foreign Application Priority Data

Feb. 7, 1998 (DE) .............................. 198 04 958

(51) Int. Cl.$^7$ .............................. G01C 3/08; G01S 13/08
(52) U.S. Cl. .................. 356/5.08; 342/135; 356/5.01; 356/5.05
(58) Field of Search .................. 356/5.01–5.08; 342/134, 135

(56) References Cited

U.S. PATENT DOCUMENTS

| | | | |
|---|---|---|---|
| 3,503,680 | * | 3/1970 | Schenkerman . |
| 3,645,624 | * | 2/1972 | Schenkerman . |
| 4,125,835 | * | 11/1978 | Barry . |
| 4,699,508 | * | 10/1987 | Bolkow et al. . |
| 5,504,570 | | 4/1996 | Akasu ............................ 356/5.05 |
| 5,676,403 | | 10/1997 | Klinger .............................. 285/93 |

FOREIGN PATENT DOCUMENTS

| | | |
|---|---|---|
| 27 38 639 | 3/1978 | (DE) . |
| 36 20 226 | 7/1987 | (DE) . |
| 36 20 226 A1 | 7/1987 | (DE) . |
| 41 33 196 C2 | 8/1997 | (DE) . |
| 196 11 233 | 9/1997 | (DE) . |
| 0 742 450 | 11/1996 | (EP) . |

* cited by examiner

Primary Examiner—Stephen C. Buczinski
(74) Attorney, Agent, or Firm—J. Gordon Lewis

(57) ABSTRACT

A process for determining the distance (D) between a distance sensor and an object. A transmitter sends wave pulses with a predetermined first frequency fb 1 and the wave pulses reflected by the object are received by a receiver and are directed in the form of an analog electrical incoming signal to an A-D converter. The latter scans the incoming signal with a second frequency f2 with f2>f1 and converts it into a digital signal Z(t) which is evaluated for determining a distance value (D) in the following manner:

a) Evaluation of the digital signal Z(t) for determining a first wave pulse propagation time (T1);
b) k-fold repetition of the step a) for determining the total k wave pulse propagation times (T1, T2, . . . , Tk);
c) Calculation of a mean wave pulse propagation time (T=(T1+T2+ . . . +Tk)/k); and
d) Calculation of the distance value (D) in accordance with D–v=T/2.

11 Claims, 2 Drawing Sheets

EVALUATION CONCEPT FOR DISTANCE MEASURING PROCESSES

BACKGROUND OF THE INVENTION

The invention relates to a process or a device for determining the distance between a distance sensor and an object.

Processes for distance measuring in accordance with the propagation time principle are already known.

In the case of a known propagation time measuring process, a light pulse is emitted at a predetermined starting time and, simultaneously, a counter is tripped. The light pulse is reflected on an object whose distance is to be determined and the reflected light pulse is picked up by a receiver and is verified by means of analog detection electronics. At the moment of verification, the counter is stopped and from the elapsed Time duration as well as the known speed of light (c=300,000 km/s), the distance of the object is determined. Due to the high speed of the light, rapid detection electronics are required.

One task of the present invention lies in indicating a distance-determining process which provides a high degree of measuring precision while requiring a minimum of hardware.

Furthermore, one task of the present invention consists in the creation of a device that determines the distance with a high degree of measuring precision and that can be produced in a cost-efficient manner.

Through direct scanning of the incoming signal by means of an A-D converter, a cost-efficient arrangement can he realized since detection electronics for monitoring the analog incoming signal are not required. Instead, the incoming signal is digitalized directly, i.e. prior to its evaluation, whereby it is made possible to perform all additional signal processing and evaluation by computer.

However, the digitalization of the incoming signal has as a consequence the temporal resolution of the digitalized signal being limited by the scanning frequency (f2) of the A-D converter. For example, with a scanning frequency of f2=40 MHz and v=c, an individual scanning interval corresponds to a path of 3.75 m. In accordance with the process of the invention, the distance resolution is increased in that not only one but several—namely k wave pulse propagations time values (T1, T2, ... 1 Tk) are determined and from these k propagation time values, the arithmetic mean (T) is calculated. This averaging increases the distance resolution since, due to the A-D converter, the [scanning] instants are independent with respect to time from the emission instants of the individual wave pulses. The asynchronous scanning makes it possible for, with the pulse propagation times of different wave pulses which are actually identical (i.e. in the case of a continuous distance), a stochastic distribution of the measured propagation times (T1, T2, ... , Tk) to be registered. Due to averaging in accordance with the invention via the k measured propagation times (T1, T2, ... , Tk), which are distributed stochastically at the actual propagation time, the resolution of the measurement is then increased by the factor √k. Due to this increase of the measuring resolution, created with the aid of a software solution, on the other hand, a realization of the process of the invention is made possible which is more cost-efficient with respect to the hardware requirements. The cause for this can be seen in the fact that, due to the increase in resolution for the purpose of achieving a predetermined measuring resolution of the total system required in practice as achieved in accordance with the invention through calculation, it is possible to use an appropriately slower and, hence, more cost-efficient A-D converter instead.

While basically, for the purpose of determining each individual wave pulse propagation time (Ti), i=1, ... , k, respectively, merely the digital signal (Z(t)) obtained with respect to a received wave pulse has to be evaluated, the determination of the individual wave pulse propagation times, Ti, i=1, ... , k, in accordance with a preferred embodiment of the invention, takes place in accordance with a mean digital signal <Z (t)> obtained on the basis of n emitted wave pulses. The signal averaging via n signal sequences, which has nothing to do with the previously described time averaging via k-calculated pulse propagation times, causes the mean digital signal <Z(t)> to have a substantially improved signal-to-noise ratio, since noise components are lost during averaging while signal components add up. Therefore, by increasing n, it is possible to increase in particular the measuring range of the distance measuring process of the invention.

However, it must be taken into consideration that the measuring time increases proportionately with respect to n. Therefore, it is advantageous to always select n great enough in order to ensure that the signal-to-noise ratio of the mean digital signal <Z(t)> is just sufficient for additional signal processing.

Preferably, n is selected between 10 and 100. Since the improvement of the signal-to-noise ratio is proportional to √n, a 3.16- to 10-fold increase of the signal-to-noise ratio is thereby achieved.

An additional advantageous variation of an embodiment of the present invention is characterized in that the evaluation of the digital signal Z(t)—or, in the case of signal averaging, the evaluation of the mean digital signal <Z(t)>—respectively comprises the following steps for the calculation of the individual pulse propagation times Ti, i=1, ... , k:

Calculation of a correlation function F (τ)=in accordance with the equation $$F(\tau) = \lim_{T \to \infty} \frac{1}{2T} \int_{-T}^{+T} Z(t) R(t - \tau) \, dt$$

or $$F(\tau) = \lim_{T \to \infty} \frac{1}{2T} \int_{-T}^{+T} \langle Z(t) \rangle R(t - \tau) \, dt$$

wherein R(t) is a predetermined, digitalized reference signal with a temporal resolution which is higher by an order of m than Z(t) or <Z(t)> and wherein m is an integral number with m>1, and determination of the wave pulse propagations time T1 (and during subsequent passes, also of the remaining wave pulse propagation times T2, ... Tk) as that time at which the correlation function F(τ) is maximum.

On the one hand, the correlation serves to improve in an appropriate manner the temporal resolution of the received digital signal Z(t) or <Z(t)>—possibly averaged via n wave pulses—by convolution with a reference signal R(t) having a temporal resolution which is higher by an order of m. For this reason, it is possible to improve the distance resolution of the measuring process of the invention by increasing m in a manner similar to that of increasing k. On the other hand, the correlation is used for determining the wave pulse propagation times Ti, i=1, ... , k by means of a maximum value analysis of the function F(τ).

Preferably, m lies between 2 and 10. When selecting m, one must take into consideration that as m increases, the complexity of the calculation increases.

Preferably, from the mean digital signal <Z(t)>, the reflected total intensity and/or the maximum intensity and/or the signal-to-noise ratio is determined and at least one of these parameters is used for controlling the amplification of an amplifier amplifying the incoming signal. For example, the control may take place in such a way that the amplification is increased when the reflected total intensity or also the maximum intensity drops below a predetermined value.

In a preferred manner, from several determined distance values T, data may also be obtained via a relative movement between the object and the sensor. This takes place in such a way that the obtained distance values (D) are entered in a memory and from several distance values (D) the continuous relative speed between the object and the distance sensor is determined by differentiation with respect to time.

Basically, the sensor may be of any desired type. A highly efficient embodiment of the device of the invention, particularly applicable in motor vehicles, is characterized in that the sensor comprises an infrared laser diode as an emitter.

Advantageously, after the A-D converter, an intermediate memory is provided which continuously stores the digital signal and from which the evaluation circuit receives the digital signal by reading the intermediate memory. For this purpose, a FIFO method is particularly suited because its read-in cycle is independent of its output cycle and, for this reason, it is suited for the coupling of asynchronous systems.

BRIEF DESCRIPTION OF THE DRAWING

In the following, the invention is described in greater detail in the drawing by means of an example, wherein.

DESCRIPTION OF THE PREFERRED EMBODIMENT

Figure 1:
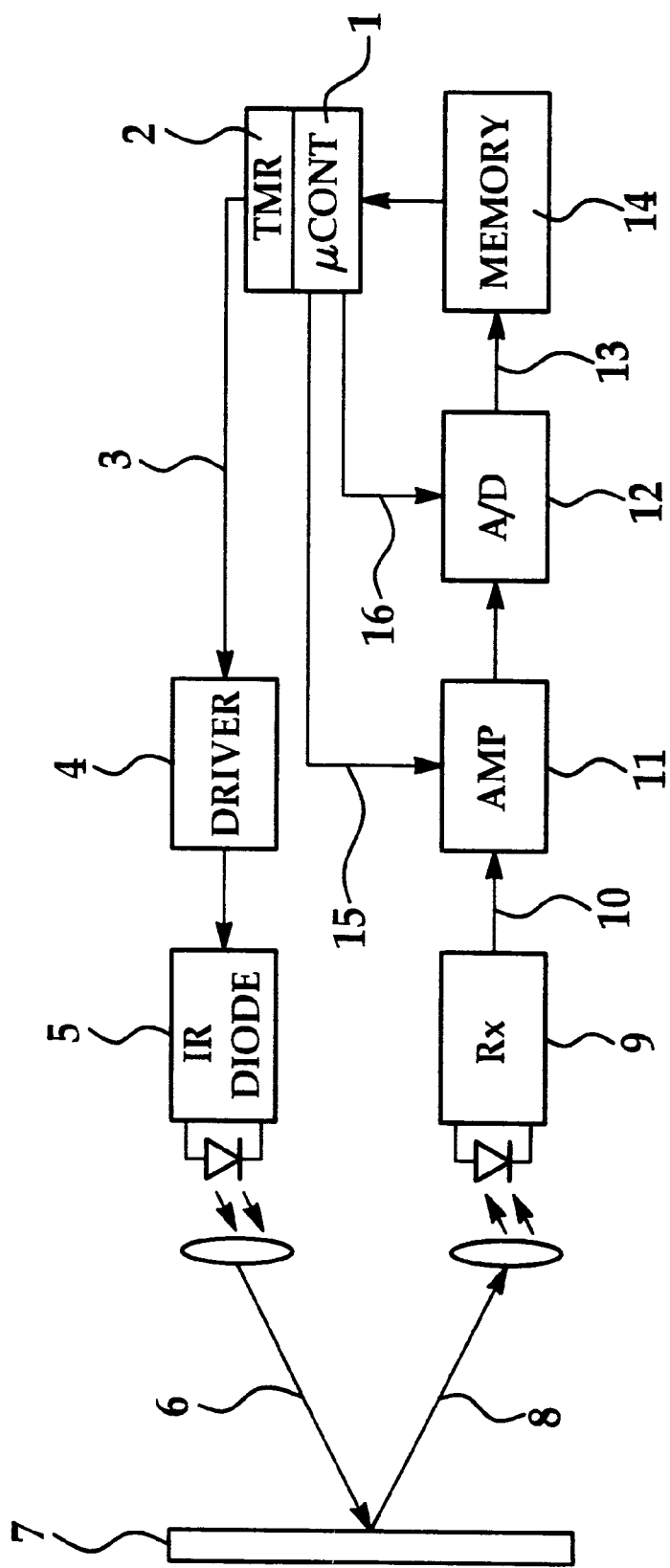
FIG. 1 shows a schematic representation of an embodiment of the device of the invention for distance measuring.

A device for measuring the distance has a microcontroller (1) comprising a timing device (2) which emits an electrical pulse signal (3) to a driver circuit (4) for an IR laser diode (5). The IR laser diode (5) is of the heavy-duty type so as to be able to allow for a large measuring range.

The light pulses (6) emitted by the IR laser diode (5) are reflected on an object (7) and the reflected light pulses (8) are picked up by a receiver in the form of a high-speed photodiode (9). The emitted light pulses (6) have a short pulse propagations time of approximately 20 to 50 ns so as to make possible a precise distance measurement, even in the case of short distances in the area of 2 m.

The incoming signal (10) emitted by the photodiode (9) is directed to an amplifier (11) and, upon amplification and possibly an additional signal shaping, is made available to an A-D converter (12). The A-D converter (12) continuously scans the incoming signal (10) at a frequency f2 and, at that time, processes a digital signal Z(t) which is identified in FIG. 1 with the reference symbol (13).

The digital signal Z(t) is entered in a FIFO (first-in-first-out) buffer memory (14) and is available to the microcontroller (1) at the output of the FIFO buffer memory (14). The microcontroller (1), independently of the scanning frequency (f2) of the A-D converter which determines the data supply on the input side, can access with its slower frequency (for example, the frequency f1) the data stored in the FIFO buffer memory (14).

Furthermore, the microcontroller (1) is connected via a control line (15) with the amplifier (11) and via a message line (16) with the A-D converter (12).

Figure 2:
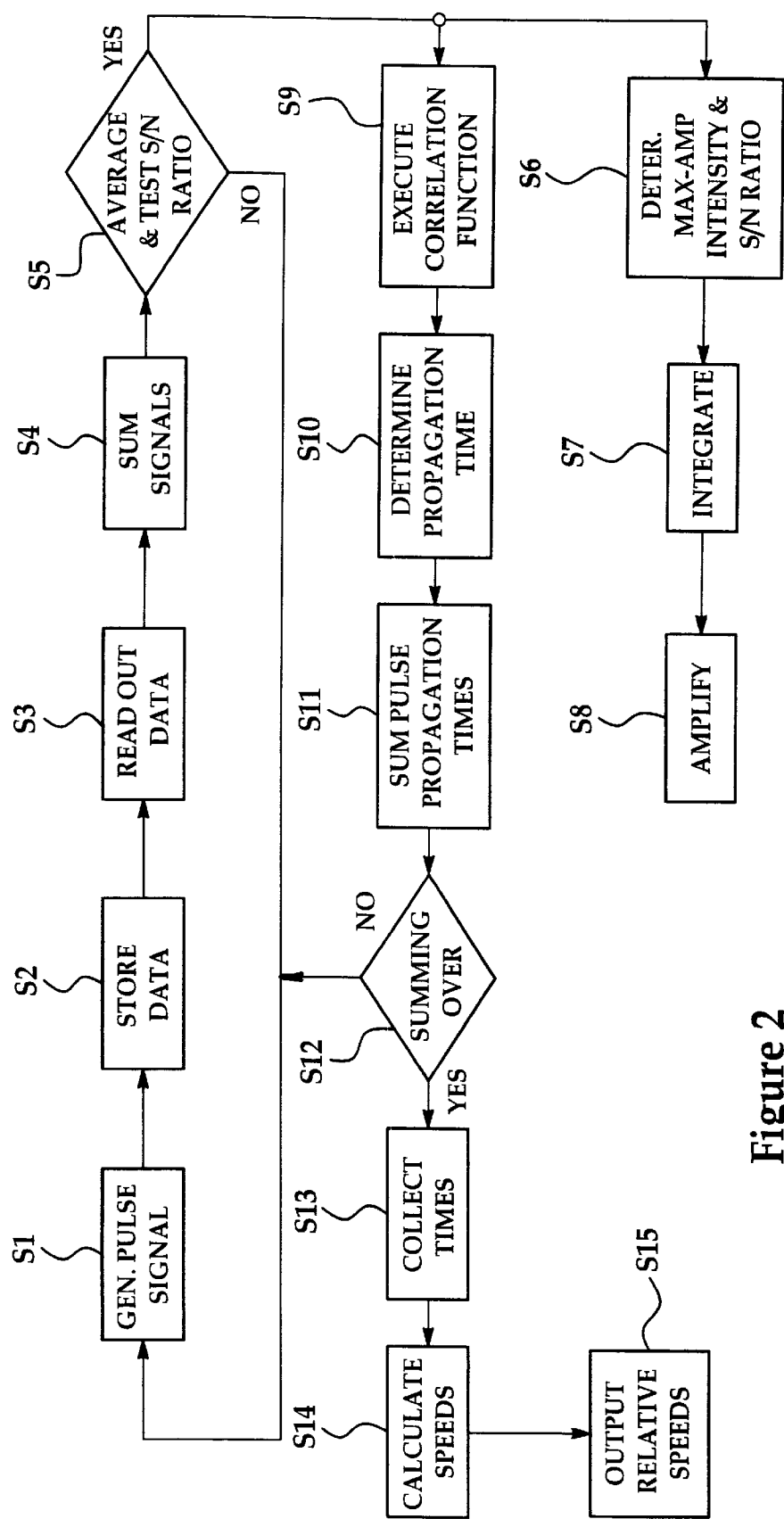
FIG. 2 shows a schematic block diagram to further explain an example of the process of the invention.

By means of FIG. 2, an example of the process of the invention is explained.

At first, in step (S1), by means of the pulse generator (2) integrated in the microcontroller (1), the pulse signal (3) with a frequency f1 is produced, with which the IR laser diode (5) is driven. Subsequently, the IR laser diode (5) emits a predetermined sequence of light pulses. In step (S2), the intermediate memory (14) is filled with the received data which were digitalized by the A-D converter (12). The data arrive at a frequency f2. The data stored in the intermediate memory (14) are read out by the microcontroller (1) in step S3 and are processed further either immediately or are stored at first in an additional storage area of the microcontroller (1) for later processing.

In steps (S4 and S5), the signal averaging step for the purpose of improving the signal-to-noise ratio takes place. This takes place in step (S4) by means of an n-fold summing of the respective signal data sequences $Z1(t), \ldots, Zn(t)$ received with respect to a light pulse and by means of a subsequent averaging in step (S5), wherein the mean digital signal $<Z(t)>$ is calculated.

The summing of the individual signal sequences $Z1(t), \ldots, Zn(t)$ may, for example, take place in the following manner. The A-D converter (12) is informed of each emission of a light pulse by means of the microcontroller (1) via the message line (16). During each message, the A-D converter (12) produces a certain previously determined binary signal which serves as a mark. In this way, the marks separate in the digitalized signal Z(t) the individual signal sequences $Z1(t), \ldots, Zn(t)$, respectively assigned to a light pulse. During the summation in step (S4), the marks are detected and the binary numbers (i.e. the signal amplitudes with respect to equal propagation times) of each sequence $Zi(t), i=1, \ldots n$, respectively located at the same locations behind the mark, are added and the respective sum value is divided by n in step (S5). This process is based on the fact that the intermediate memory (14) leaves the sequence of the intermediately stored data unchanged.

In addition to arriving at the mean value, in step (S5) also a test is conducted to determine whether the mean digital signal $<Z(t)>$ has a signal-to-noise ratio which is sufficient for further signal processing. If this is not the case, the process returns to step (S1) and an additional sequence of light pulses is created with which the signal averaging is continued in steps (S4 and S5). With an adequate signal-to-noise ratio of the mean signal $<Z(t)>$, the process moves to step (S6) and to step (S9).

In step (S6), the maximum amplitude, the integral signal intensity as a measure for the entire backscatter of the light pulse, as well as the signal-to-noise ratio are determined. The obtained values are directed in step (S7) to a PID-controller, which is possibly integrated in the microcontroller (1) and controls the amplification of the amplifier (11) via the control line (15) in step (S8).

Steps (S9 and S10) relate to the correlation of the mean digital signal $<Z(t)>$ with a discrete reference signal R(t) which, for example, may be realized in the form of a Gauss pulse. Here, the discrete reference signal R(t) has a temporal resolution which is higher than the signal $<Z(t)>$ by an order of n, the temporal resolution of the latter being given by (f2).

For this purpose, in step (S9), the correlation function $F(\tau)$ is numerically calculated in accordance with the subsequent relation:

$$F(\tau) = \lim_{T \to \infty} \frac{1}{2T} \int_{-T}^{+T} |Z(t) R(t-\tau) dt$$

In step (S10), the propagations time (T1) is determined as an instant of the maximum correlation between the reference signal R(t) and the mean digital signal <Z(t)>. The distance information (T1) gained thereby has a temporal resolution which is higher by an order of m with respect to the digital signal Z(τ) and the mean digital signal <Z(t)>.

The time averaging of the invention is carried out in steps (S11 and S12).

In step (S11), the k-fold summing of pulse propagation times (Ti), determined sequentially in step (S10), takes place with i=1,...k. For this purpose, in step (S11), the value (T1) is stored and then the transition to step (S12) is made. Step (S12) examines whether the k-fold summing has already been concluded, which is obviously not yet the case with the first pass (i.e. T1). The entire process described so far is then repeated and in this way, the pulse propagation times (T2, T3, etc.) are determined and are summed in step (11). During the summing of the last pulse propagations time (Tk) in step 11, the recursion in step (S12) is then broken off and by dividing the summed pulse propagation times (T1+T2+ . . . +Tk) by k, the temporal mean value (T) is determined. The distance value (D) is then determined from the value (T).

In step (S13), time values (T) determined in the described manner are collected and in step (S14), a relative speed between the sensor and the object is calculated from these values. In step (S15), the determined relative speed values are output.

What is claimed is:

1. A process for determining the distance between a distance sensor and an object, wherein an electrical pulse signal with a predetermined first frequency (f1) is directed to one transmitter of the distance sensor, the transmitter transmits upon the occurrence of each electrical pulse a wave pulse, the wave pulses are reflected off the object, a receiver of the distance sensor receives the reflected wave pulses and puts out an analog electrical incoming signal, characterized by the steps of: continuously scanning the analog electrical incoming signal by an A\D converter at a second frequency (f2) with f2>f1, converting the scanned electrical incoming signal into a digital signal Z(t), and evaluating the digital signal Z(t), for the purpose of determining a distance value (D), by:

a) evaluating the digital signal Z(t), received with respect to one or several emitted wave pulses, for determining a first wave pulse propagation time (T1);
   b) k-fold repeating step a) for determining total k wave pulse propagation times (T1, T2, . . . , Tk), wherein k is an integral number with k>1;
   c) calculating a mean wave pulse propagations time T (T1+T2+ . . . +Tk)/k;
   d) calculating the distance value (D) in accordance with D=v*T/2, wherein v is the propagation speed of the wave pulses;
   continuously entering the obtained distance values (D) in a memory; and
   differentiating several distance values (D) with respect to time to continuously determine the relative speed between the object and the distance sensor.

2. The process in accordance with claim 1 characterized in that in step a) the digital signal Z(t) is evaluated with respect to a plurality of n wave pulses, wherein n is an integral number with n>1, and further comprising the steps of:

a1) breaking down the digital signal Z(t) into signal sequences Z1(t), . . . , Zn(t) which are in n temporal order;
   a2) forming a mean value via the n signal sequences, and calculating a mean digital signal <Z(t)>; and
   a3) using the mean digital signal <Z(t)> for determining the first wave pulse propagations time (T1).

3. The process in accordance with claim 2 characterized in that n is between 10 and 100.

4. The process in accordance with claim 2 characterized in that the evaluation of the digital signal Z(t) in step a) and of the mean digital signal <Z(t)> in step 2a2) comprises steps:

calculating a correlation function F(τ) of the type according to one of the equations:

$$F(\tau) = \lim_{T \to \infty} \frac{1}{2T} \int_{-T}^{+T} |Z(t) R(t-\tau) dt$$

$$F(\tau) = \lim_{T \to \infty} \frac{1}{2T} \int_{-T}^{+T} |(Z(t)) R(t-\tau) dt$$

wherein R(t) is a predetermined, discretized reference signal with a temporal resolution which is higher by an order of m than Z(t) or <Z(t)> and wherein m is an integral number with m>1 and the determination of the wave pulse propagation time T1 is the time at which the correlation function F(τ) is maximum.

5. The process in accordance with claim 4 characterized in that the discretized reference signal R(t) is a Gauss function.

6. The process in accordance with claim 4 characterized in that m is between 2 and 10.

7. The process in accordance with claim 1 characterized in that the wave pulses are light pulses and the pulse propagation time is between 20 and 50 ns.

8. The process in accordance with claim 1 characterized in that f1 is between 1 kHz and 10 kHz.

9. The process in accordance with claim 1 characterized in that f2 is approximately 40 MHz.

10. The process in accordance with claim 2 characterized in that, from the mean digital signal <Z(t)>, the reflected total intensity and/or the maximum intensity and/or the signal-to-noise ratio is determined, at least one of which controls the amplification of an amplifier for amplifying the incoming signal.

11. A process for determining the distance between a distance sensor and an object, wherein an electrical pulse signal with a predetermined first frequency (f1) is directed to one transmitter of the distance sensor, the transmitter transmits upon the occurrence of each electrical pulse a wave pulse, the wave pulses are reflected off the object, and a receiver of the distance sensor receives the reflected wave pulses and puts out an analog electrical incoming signal, characterized by the steps of: continuously scanning the analog electrical incoming signal by an A/D converter at a second frequency (f2) with f2>f1, converting the scanned electrical incoming signal into a digital signal Z(t), and evaluating the digital signal Z(t), for the purpose of determining a distance value (D), by:

a) evaluating the digital signal Z(t), received with respect to a plurality of n wave pulses, wherein n is an integral number (n>1), the evaluating step further including the steps of:
      a1) breaking down the digital signal Z(t) (13) into signal sequences Z1(t), . . . , Zn(t) which are in n temporal order;

a2) forming a mean value via the n signal sequences, and calculating a mean digital signal <Z(t)>; and a3) using the mean digital signal <Z(t)> for determining a first wave pulse propagation time (T1);

b) k-fold repeating step a) for determining total k wave pulse propagation times (T1, T2, . . . , Tk), wherein k is an integral number with k>1;

c) calculating a mean wave pulse propagations time T (T1+T2+ . . . +Tk)/k;

d) calculating the distance value (D) in accordance with D=v*T/2, wherein v is the propagation speed of the wave pulses.

* * * * *